United States Patent [19]
Dobias

[11] 3,967,061
[45] June 29, 1976

[54] METHOD AND APPARATUS FOR RECOVERING DATA AND CLOCK INFORMATION IN A SELF-CLOCKING DATA STREAM

[75] Inventor: Joseph J. Dobias, Poway, Calif.
[73] Assignee: NCR Corporation, Dayton, Ohio
[22] Filed: Mar. 5, 1975
[21] Appl. No.: 555,518

[52] U.S. Cl. .............................. 178/69.5 R; 178/88; 325/38 R; 340/347 DD
[51] Int. Cl.² ........................................... H04L 7/00
[58] Field of Search ................. 178/66, 67, 69.5, 68, 178/88; 325/38 R, 30, 161, 164; 340/347 DD; 235/154

[56] References Cited
UNITED STATES PATENTS
3,659,286  4/1972  Perkins et al. ............... 325/38 R X
3,820,031  6/1974  Smithlin .................... 340/347 DD X

*Primary Examiner*—Benedict V. Safourek
*Assistant Examiner*—Robert Hearn
*Attorney, Agent, or Firm*—J. T. Cavender; James H. Phillips

[57] ABSTRACT

A method and apparatus is described for receiving a data stream incorporating a self-clocking Manchester code. The data stream is applied to monostable multivibrators which produce pulses at each positive-going and negative-going transition in the voltage level of the data stream. Output pulses from the monostable multivibrators are applied to a third monostable multivibrator which is responsive to only the positive-going pulses applied thereto; the third multivibrator produces an output pulse having a period greater than one-half the bit period, but less than the whole bit period, of the data stream. The positive-going voltage transition of the output of the third multivibrator is used to trigger a clock pulse which is applied to a pair of gates. The gates enable a pair of latches to which the data stream is applied to recover data from the stream and apply the data to a shift register.

21 Claims, 6 Drawing Figures

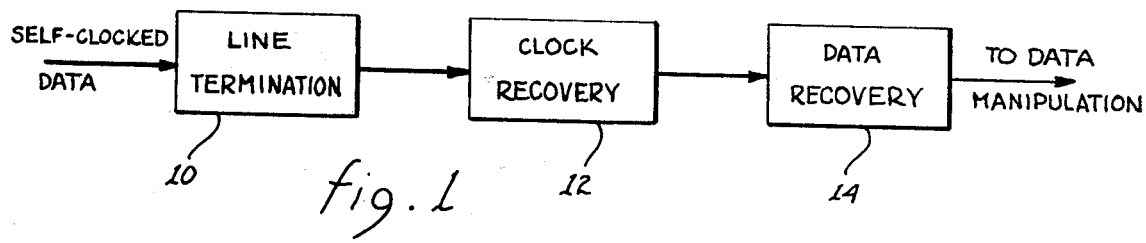
fig. 1
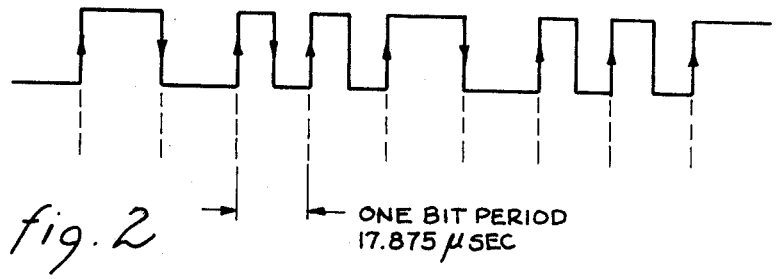
fig. 2 — ONE BIT PERIOD 17.875 μSEC
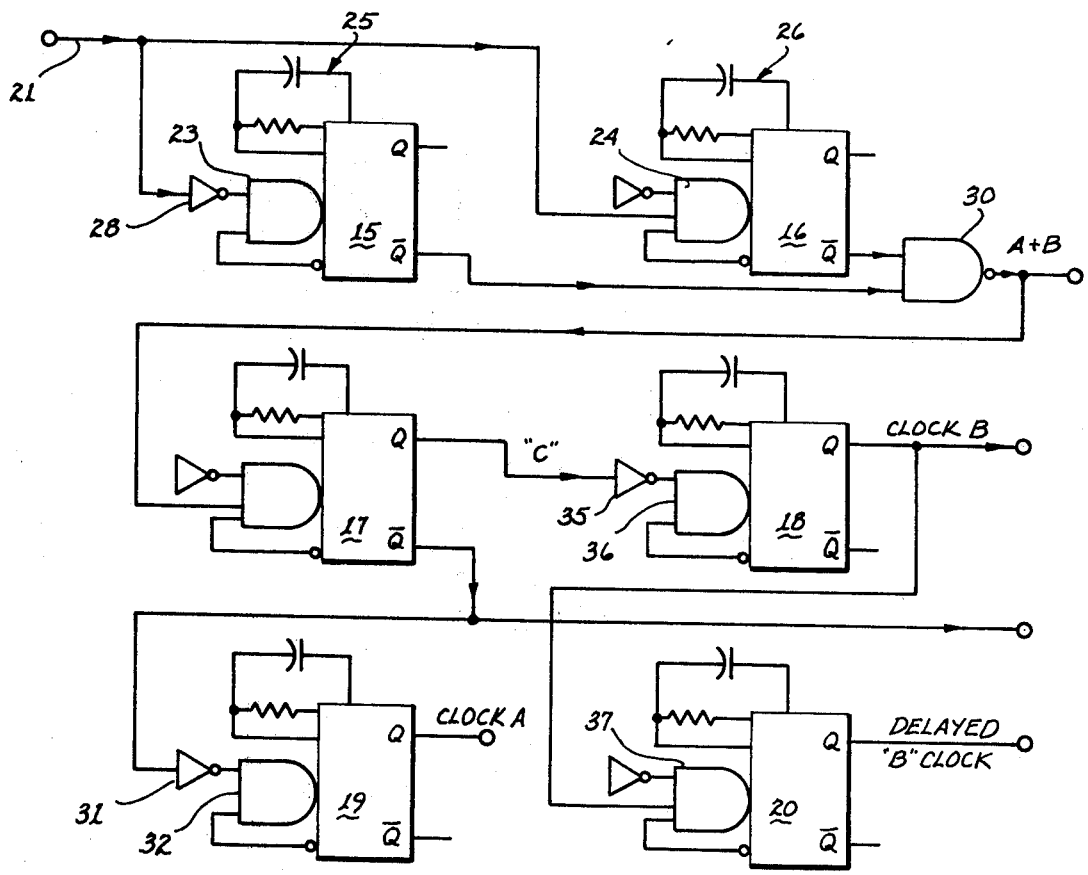
fig. 3

METHOD AND APPARATUS FOR RECOVERING DATA AND CLOCK INFORMATION IN A SELF-CLOCKING DATA STREAM

The present invention pertains to a clock and data recovery system and more particularly to a system for recovering a clock from a self-clocking data stream and using the clock recovered from the stream to capture the data in the stream.

Communication among data processing equipment can become quite complex and expensive, particularly when the communication is in encoded digital form and when such communication is attempted to be accomplished synchronously. Obviously, simplification may be achieved by permitting the processing equipment such as processors and intelligent peripherals to communicate in asynchronous fashion. Simplification can also be achieved by serializing the communication rather than attempting parallel word or byte transfer. If the information is to be transmitted serially and asynchronously by bit stream, the information content of the stream must be derived through the utilization of a clock that is related to the information being transmitted. Further, to accommodate the volume of information being transmitted, bit rates must be quite high.

To render feasible such serial information transfer, the data being transferred may incorporate, as an integral part thereof, clocking information; such data stream being referred to as a self-clocking data stream.

One technique that lends itself to high speed data transmission, at least over relatively short lines such as in house communication between a processor and intelligent peripherals or controllers, is the utilization of a self-clocking data system incorporating a self-clocking Manchester or bi-phase coded balanced line bit stream. Utilizing Manchester or bi-phase coded bit streams, at least one voltage level transition is required for every bit time. A single voltage level change within the bit time represents one binary value while two voltage level changes represent a second binary value.

Although the use of such Manchester coded bit streams may have the disadvantage of requiring significant frequency bandwidth, the system is accompanied by substantial advantages. When high speed data transmission in serial bit form is used, for example, in excess of six megabits per second, co-axial or twin co-axial cables are called for. Line balancing (regardless of the bit pattern) is always provided since the energy transmitted during the positive-going and negative-going voltage excursions is the same. Therefore, difficult problems such as common mode rejection and ground loop returns are either eliminated or rendered significantly less important.

It is therefore an object of the present invention to provide a method and apparatus for recovering data from a self-clocking bi-phase or Manchester code data stream.

It is another object of the present invention to provide apparatus for generating a clock pulse coinciding with the clock information in a Manchester or bi-phase data stream.

It is still another object of the present invention to extract clock information from a bi-phase self-clocking data stream and to use the clock information to extract data from the data stream.

It is still another object of the present invention to provide a method and apparatus for recovering clock information from a bi-phase or Manchester code data stream and to then extract data from the stream.

These and other objects of the present invention will become apparent to those skilled in the art as the description thereof proceeds.

Briefly, in accordance with the embodiment chosen for illustration, the method and apparatus of the present invention contemplates the utilization of a plurality of monostable multivibrators, or one-shots, two of which are connected to receive the incoming data stream. One of the one-shots is responsive to the positive-going transition of voltage level of the data stream, while the second one-shot is responsive to the negative-going voltage transition. Each of these one-shots produces an output pulse having a pulse width of approximately one-quarter the bit period of the data stream. The output pulses from the one-shots are applied through a logic OR gate to a third one-shot; the latter is responsive only to positive-going transitions in voltage level and produces an output pulse having a pulse width slightly greater than one-half of the bit period of the data stream. The output pulse from this third one-shot in both its true form and not true form are utilized to generate clock pulses corresponding to the clock information contained in the data stream.

The output of the third one-shot is applied to a flip-flop which alternately enables two latches, each of which also receives the OR'ed output of the first two one-shots. The latches each effectively count the number of voltage level transitions in each bit period of the data stream and present an output indication to a shift register of the bit value of the corresponding bit position.

The present invention may more readily be described by reference to the accompanying drawings in which:

FIG. 1 is a functional block diagram showing a simplified form of data and clock information flow.

FIG. 2 is an exemplary wave form useful in describing the bi-phase or Manchester code signal pattern.

FIG. 3 is a schematic block diagram useful in describing the method and apparatus of the present invention relating to the recovery of clock information from the data stream.

Referring now to FIG. 1, self-clocking data such as a data stream using a Manchester or bi-phase code, is applied to a suitable line termination station 10. The bit stream may, for example, be transmitted over an appropriate twinax line from a processor, controller, intelligent peripheral or other source usually under the control of a central system. The serial bit streams may be at a relatively high transmission rate (for example, 56 Kilobits per second [KBPS]); further, message framing, control codes, stuffing bits and frame checking sequences may be implemented in the data stream but need not be described here. Typically, line termination is provided with a relatively high DC voltage isolation and low capacitive coupling; those skilled in the art may provide different termination techniques although the use of opto-isolators provides excellent termination and permits matching of incoming signal levels to those used in popular TTL logic technique.

The data stream, after transmission over the appropriate line, and after suitable termination and matching, is applied to a clock recovery system 12; clock pulses are then generated and are keyed to the clock information present in the data stream. The data stream (which may be modified at this point) is applied, together with the derived clock, to a data recovery system 14 which extracts the binary information content of the data stream and suitably, temporarily stores the information such as in a shift register, to be delivered to and used by the information-receiving system. The method and apparatus of the present invention are concerned with the clock and data recovery.

Referring now to FIG. 2, an explanation of a Manchester or bi-phase code will be given. Assuming a bit rate of 56 KBPS, a single bit period is 17.875 u sec. The voltage level of the transmitted wave form is either high or low and the transitions from one level to the other represent the clock and data content of the data wave form. A single transition from one voltage level to another during one bit period is arbitrarily chosen as a binary "0". If another voltage transition occurs during the bit period, the information contained during that bit period is arbitrarily considered to be a binary "1". Thus, the information content of the code may be determined by locating the beginning voltage transition of the bit period and observing any voltage transitions occurring during the bit period; obviously, it is necessary to properly locate the beginning of each bit period so that the observations of the following bits will be made during the succeeding bit periods and not at the beginning or end of the bit periods.

Figure 4:
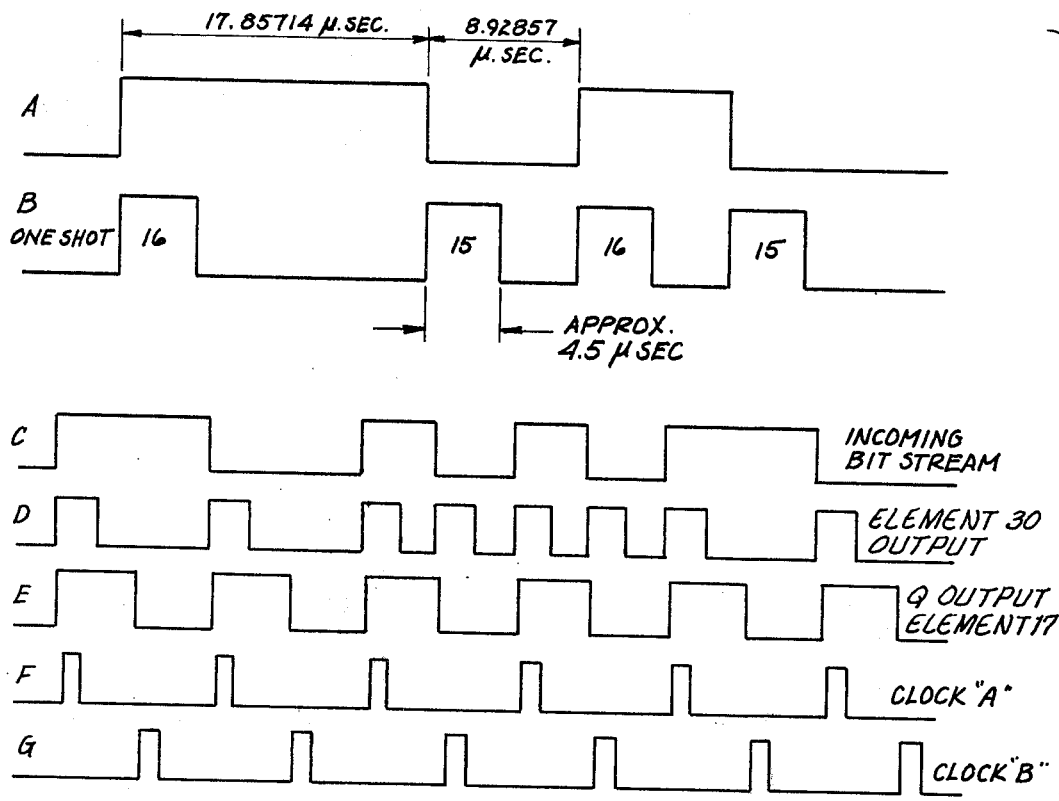
FIGS. 4A through 4G are wave forms showing timing and signal level information of various signals present in the schematic block diagram of FIG. 3.

Referring now to FIGS. 3 and 4, the incoming bit stream such as shown in FIG. 4C is applied through line 21 to monostable multivibrators or one-shots 15 and 16. Those skilled in the art will recognize that there are innumerable one-shot designs that provide simple monostable multivibrator functions. Similarly, the symbology used for such one-shots may vary considerably. In describing the apparatus of the present invention, one-shots, such as the one-shots 15 and 16, are shown having input gates 23 and 24, respectively, and are shown with external RC networks 25 and 26 that may be utilized to indicate time-constant figures or the circuit values used to achieve a given output pulse width. The bit stream applied to the one-shot 15 through the gate 23 passes through an invertor 28 so that the one-shot 15 is responsive only to the negative-going voltage transitions of the data stream. The one-shot 15, as with the remaining one-shots described herein, includes two outputs, the first of which may be designated the "Q" output and the other, the "$\overline{Q}$" output. The bit stream is applied to the one-shot 16 through the gate 24 without an intervening invertor so that the one-shot 16 is responsive only to the positive-going voltage level transitions of the bit stream. The "$\overline{Q}$" output for each of the one-shots 15 and 16 are applied to OR gate 30. In the embodiment chosen for illustration, two one-shots 15 and 16 are used; one of the one-shots is responsive to positive-going voltage level transitions while the other is responsive to negative-going voltage level transitions. The utilization of two one-shots permits the use of one-shots having a slower response time since each need only respond to a voltage level transition in a particular direction. Obviously, a single, faster response time one-shot could be used to replace one-shots 15 and 16 and could be made responsive to both positive-going and negative-going voltage level transitions to product output pulses in response to all of the transitions occurring in the data bit stream.

The incoming bit stream is shown in FIG. 4C while the output of the OR gate 30 is shown in FIG. 4D. The bit period (assuming 56 KBPS) is as stated previously, 17.857 u sec., while a half bit period (the time when a second voltage level transition is made to indicate a binary "1") is 8.928 u sec. The pulse width of the output pulses derived from one-shots 15 and 16 is adjusted to approximately 4.5 u sec. The pulse width relationship of a bit period and the pulses from one-shots 15 and 16 may be seen by comparing FIGS. 4A and 4B. The pulse widths of FIGS. 4A and 4B have been exaggerated while the pulse widths of the remaining wave forms of FIG. 4 are approximately to scale with respect to each other.

The output pulses of one-shots 15 and 16, after being OR'ed in gate 30, are applied to one-shot 17 which, since the input thereto has not been inverted, is responsive only to positive-going voltage transitions. When the one-shot 17 has been triggered by a positive-going voltage transition at the input thereof, the voltage level at the "Q" output thereof becomes high and does not return to its pre-triggered voltage level for a period of time determined by its delay period in accordance with well known monostable multivibrator operations. The pulse output at output "Q" of one-shot 17 is shown in FIG. 4E. The pulse width of the output of one-shot 17 is chosen to be slightly greater than the 8.928 u sec. half pulse period of the incoming bit stream. Conveniently, the pulse width may be chosen to be 10 u sec.

By producing pulses at every positive-going and negative-going voltage transition of the incoming bit stream, and by applying these generated pulses to the one-shot 17 having a pulse duration greater than one-half the bit period, the system automatically "blanks" the voltage transitions occurring within the bit period and specifically identifies the voltage transition occurring at the beginning of each bit period. For example, by examining the wave forms of 4C, 4D and 4E, it may be seen that the leading edge of each of the pulses in FIG. 4E coincides with or slightly follows by a constant delay the beginning of each bit period of the bit stream of the FIG. 4C. The fact that there are voltage level transitions within the bit period is ignored since the pulse width of FIG. 4E is greater than one-half of the bit period of the bit stream to thereby force one-shot 17 to ignore voltage transitions other than those occurring at the beginning of each bit period.

The pulse output of one-shot 17 is applied from the "Q" output to one-shot 19 through invertor 31 and gate 32. One-shot 19, when triggered by the pulse from one-shot 17 produces a pulse of short duration as shown in FIG. 4F that is effectively a clock pulse occurring at the beginning of each bit period of the incoming bit stream. The "Q" output of one-shot 17 is applied through invertor 35 and gate 36 to one-shot 18 which, when triggered from the pulse from one-shot 17, produces a pulse of short duration occurring shortly after the mid-point of the bit period of the incoming bit stream. The output pulse from one-shot 18 may also be considered a clock pulse; the clock pulse from one-shot 19 is shown in FIG. 4F as a clock "A" while the clock output from one-shot 18 is shown in FIG. 4G as clock "B". For control purposes it may be desirable to utilize a clock pulse that occurs at a time in the bit period other than the times of occurrence of clocks "A" and clocks "B"; therefore, clock "B" may be applied to one-shot 20 through gate 37 to generate a clock pulse at the "Q" output thereof at any time after the occurrence of the "B" clock pulse.

Figure 5:
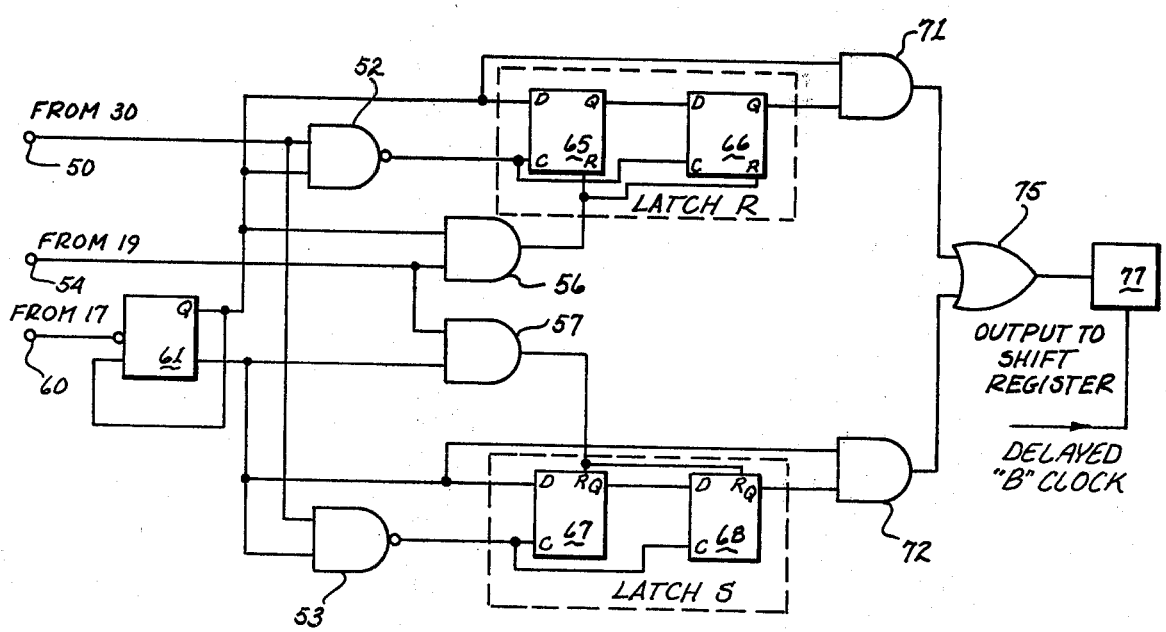
FIG. 5 is a schematic block diagram useful in describing the method and apparatus of the present invention relating to the recovery of data from an incoming data stream utilizing the clock previously recovered from the stream.
Figure 6:
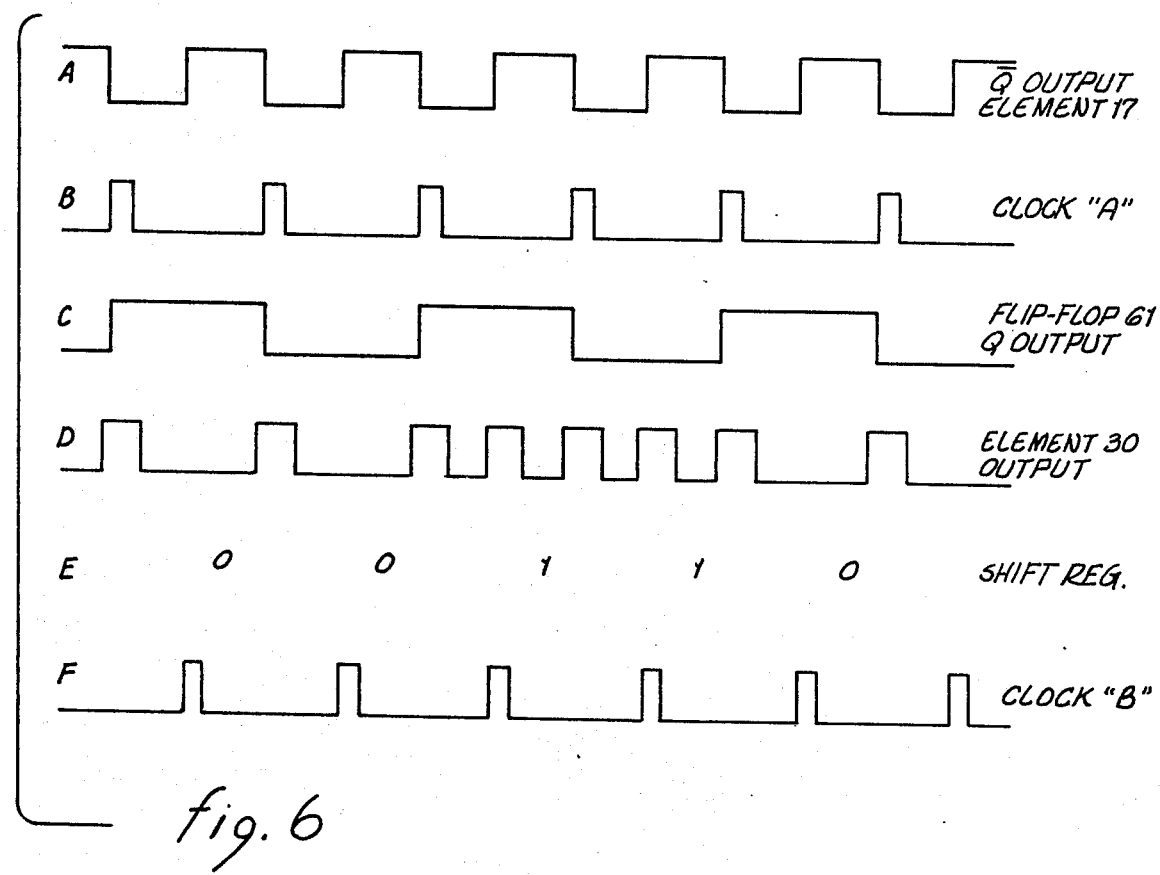
FIGS. 6A through 6F are wave forms showing timing and signal level information of various signals present in the schematic block diagram of FIG. 5.

The clock information in the incoming data bit stream has been extracted and is now presented in clock pulse form by clock "A" or by clock "B". The recovery of the data information within the data bit stream may be described by reference to FIGS. 5 and 6. The output pulses of one-shots 15 and 16 (FIG. 3) are OR'ed in gate 30 and applied to terminal 50 of FIG. 5. The combined output pulses of one-shots 15 and 16 are thus applied to and gates 52 and 53. Clock "A" pulses from one-shot 19 are applied to AND gates 56 and 57 through terminal 54. Pulses from the "Q" output of one-shot 17 are applied through terminal 60 to flip-flop 61; flip-flop 61 toggles on the negative-going voltage level transitions of the pulses from one-shot 17 and alternately causes gates 52 and 53 to be open for one bit period. When gate 52 is opened, the pulse stream from gate 30 of FIG. 3 is applied to a latching system identified in FIG. 5 as latch R.

Latch R includes flip-flops 65 and 66 which, when a pulse is applied to flip-flop 65, changes state; upon energization of flip-flop 65 a second time, flip-flop 66 changes state and together with flip-flop 61 enables gate 71 and applies an appropriate voltage level to gate 75 to indicate that two pulses were detected during the bit period and that therefore a binary "1" is present during that bit period. If only one pulse is applied to flip-flop 65, a binary "0" appears at the output of gate 71. Latch R is a re-set and the next bit period results in the enabling of gate 53 which provides pulses to latch S, comprising flip-flops 67 and 68, in a manner similar to that described above in connection with latch R. The output of gate 72, applied to gate 75, will thus present an indication of the existence of a binary "1" or "0" during the corresponding bit period. The binary information applied to shift register 77 is therefore presented in bi-level form; that is, one voltage level is provided as representative of a binary "1" and the second level is presented as representative of a binary "0". The information in this form is appropriate for TTL logic to be used by the shift register for subsequent handling.

Flip-flop 61 therefore toggles and alternately permits latch R and latch S to receive the combined pulses of one-shots 15 and 16 to count whether one or two pulses occur during alternate bit periods. The outputs of gates 71 and 72 are OR'ed in gate 75 and the data thus recovered from the data bit stream may be temporarily stored in shift register 77 to be either shifted out in serial or transferred parallel fashion and to be manipulated in accordance with the requirements of the apparatus receiving the bit stream. Wave form 6A shows the pulses derived from one-shot 17 applied to the flip-flop 61. Wave form 6B shows the "A" clock from one-shot 19 applied to gates 56 and 57. Wave form 6C indicates the toggling of flip-flop 61 in response to signals received from one-shot 17.

The combined pulse output of one-shots 15 and 16 are shown in FIG. 6D in appropriate timed relationship with respect to the toggling of flip-flop 61. It may be seen by reference to FIG. 6E that a single negative-going voltage transition of the combined pulse output of one-shots 15 and 16 will result in an indication of a binary "0" applied to the shift register 77; whereas, a double voltage transition will result in an indication of a binary "1".

It will be obvious to those skilled in the art that the wave forms shown in the above figures are schematic and somewhat idealized; in actual practice, the precise shape (e.g., rise times, etc.) will depend on specific circuit configuration, frequency, etc. While the present invention has been described by reference to a particular logic technique such as TTL circuitry, it will be obvious that other logic systems can be utilized to implement the present invention without departing from the spirit and scope thereof.

I claim:

1. A method of recovering information from a self-clocking bi-phase coded bit stream, said bit stream having a predetermined bit period and two voltage levels with negative-going and positive-going voltage level transitions occurring in the stream to indicate clock information and data information, one such voltage level transition occurring at the beginning of each bit period, the method comprising the steps of:
   a. producing a first pulse for each positive-going and each negative-going voltage level transition in said bit stream;
   b. producing a second pulse having a pulse width greater than one-half said bit period for each positive-going voltage level transition in each of said first pulses occurring at the beginning of a bit period; and
   c. producing a clock pulse for each positive-going or negative-going voltage level transition of each of said second pulses.

2. The method of claim 1, wherein the step of producing a clock pulse comprises: producing a pulse for each positive-going voltage level transition of each of said second pulses.

3. A method of recovering information from a self-clocking bi-phase coded bit stream, said bit stream having a predetermined bit period and two voltage levels with negative-going and positive-going voltage level transitions occurring in the stream to indicate clock information and data information, one such voltage level transition occurring at the beginning of each bit period, the method comprising the steps of:
   a. producing a first pulse for each positive-going and each negative-going voltage level transition in said bit stream;
   b. producing a second pulse having a pulse width greater than one-half said bit period for each positive-going voltage level transition in each of said first pulses occurring at the beginning of a bit period;
   c. producing a clock pulse for each positive-going or negative-going voltage level transition of each of said second pulses;
   d. counting the number of positive-going or negative-going voltage level transitions occurring in all of said first pulses produced between successive clock pulses; and
   e. producing a first output voltage level when said number is one and producing a second output voltage level when said number is two.

4. The method of claim 3, wherein the step of producing a clock pulse comprises: producing a pulse for each positive-going voltage level transition of each of said second pulses.

5. The method of claim 3, wherein the step of counting comprises: counting the number of negative-going voltage level transitions occurring in all of said first pulses produced between successive clock pulses.

6. A data transmission system using self-clocking bi-phase coded bit streams, said bit streams having a predetermined bit period and two voltage levels with negative-going and positive-going voltage level transitions occurring in the stream to indicate clock information and data information, one such voltage transition occurring at the beginning of each bit period, apparatus for recovering said information, including:
 a. first pulse producing means connected to receive said bit stream responsive to each positive-going and each negative-going transition in the voltage level of said bit stream for producing pulses in response thereto;
 b. a second pulse producing means connected to said first pulse producing means for receiving pulses therefrom, said second pulse producing means responsive, when not in the process of producing a pulse, to positive-going transitions in the voltage level of said pulses for producing timing pulses, each having a pulse width greater than one-half of the bit period of the data stream; and
 c. a clock pulse generator connected to said second pulse producing means responsive to positive-going or negative-going voltage level transitions in said timing pulse for generating a clock pulse.

7. The combination set forth in claim 6, wherein said first pulse producing means is a monostable multivibrator.

8. The combination set forth in claim 6, wherein said first pulse producing means is a monostable multivibrator, and said second pulse producing means is a second monostable multivibrator connected to said first monostable multivibrator.

9. The combination set forth in claim 6, wherein said first pulse producing means is a monostable multivibrator, said second pulse producing means is a second monostable multivibrator connected to said first monostable multivibrator and said clock pulse generator is a third monostable multivibrator.

10. In a data transmission system using self-clocking bi-phase coded bit streams, said bit streams having a predetermined bit period and two voltage levels with negative-going and positive-going voltage level transitions occurring in the stream to indicate clock information and data information, one such voltage level transition occurring at the beginning of each bit period, apparatus for recovering said information, including:
 a. first pulse producing means connected to receive said bit stream responsive to each positive-going and each negative-going transition in the voltage level of said bit stream for producing pulses in response thereto;
 b. a second pulse producing means connected to said first pulse producing means for receiving pulses therefrom, said second pulse producing means responsive, when not in the process of producing a pulse, to positive-going transitions in the voltage level of said pulses for producing timing pulses, each having a pulse width greater than one-half of the bit period of the data stream;
 c. a clock pulse generator connected to said second pulse producing means responsive to positive-going or negative-going voltage level transitions in said timing pulse for generating a clock pulse; and
 d. means connected to said first pulse producing means and to said clock pulse generator for counting the number of positive-going or negative-going voltage transitions from said first pulse 11. The combination set forth in claim 10, wherein said first pulse producing means is a monostable multivibrator.

12. The combination set forth in claim 11, wherein said second pulse producing means is a monostable multivibrator.

13. The combination set forth in claim 12, wherein said clock pulse generator is a monostable multivibrator.

14. In a data transmission system using self-clocking bi-phase coded bit streams, said bit streams having a predetermined bit period and two voltage levels with negative-going and positive-going voltage level transitions occurring in the stream to indicate clock information and data information, one such voltage level transition occurring at the beginning of each bit period, apparatus for recovering said information, including:
 a. first pulse producing means connected to receive said bit stream responsive to each positive-going and each negative-going transition in the voltage level of said bit stream for producing pulses in response thereto;
 b. a second pulse producing means connected to said first pulse producing means for receiving pulses therefrom, said second pulse producing means responsive, when not in the process of producing a pulse, to positive-going transitions in the voltage level of said pulses for producing timing pulses, each having a pulse width greater than one-half of the bit period of the data stream;
 c. a clock pulse generator connected to said second pulse producing means responsive to positive-going or negative-going voltage level transitions in said timing pulse for generating a clock pulse; and
 d. means connected to said first pulse producing means and to said clock pulse generator responsive to the receipt of two successive negative-going or positive-going voltage level transitions from said first pulse producing means after the receipt of a clock pulse and before the receipt of a second clock pulse from said clock pulse generator for producing a first output voltage level, and responsive to the receipt of only one negative-going or positive-going voltage level transition from said first pulse producing means after the receipt of a clock pulse and before the receipt of a second clock pulse from said clock pulse generator for producing a second output voltage level.

15. The combination set forth in claim 14, wherein said first pulse producing means is a monostable multivibrator.

16. The combination set forth in claim 15, wherein said second pulse producing means is a monostable multivibrator.

17. The combination set forth in claim 16, wherein said clock pulse generator is a monostable multivibrator.

18. In a data transmission system using self-clocking bi-phase coded bit streams, said bit streams having a predetermined bit period and two voltage levels with negative-going and positive-going voltage level transitions occurring in the stream to indicate clock information and data information, one such voltage level transition occurring at the beginning of each bit period, apparatus for recovering said information, including:

a. a first one-shot connected to receive said data stream responsive to each positive-going transition in the voltage level of said data stream for producing pulses in response thereto;
   b. a second one-shot connected to receive said data stream responsive to each negative-going transition in the voltage level of said data stream for producing pulses in response thereto;
   c. a third one-shot, having an output terminal that is at a high voltage level or a low voltage level, connected to said first and second one-shots for receiving pulses therefrom, said third one-shot responsive to, when the output terminal thereof is at said low voltage level, to positive-going transitions in the voltage level of said pulses for producing timing pulses at the output terminal thereof, each timing pulse having said high voltage level and having a pulse width greater than one-half of the bit period of said data stream; and 19. The combination set forth in claim 18, wherein said clock pulse generator is a one-shot.

20. In a data transmission system using self-clocking bi-phase coded bit streams, said bit streams having a predetermined bit period and two voltage levels with negative-going and positive-going voltage level transitions occurring in the stream to indicate clock information and data information, one such voltage level transition occurring at the beginning of each bit period, apparatus for recovering said information, including:

a. a first one-shot connected to receive said data stream responsive to each positive-going transition in the voltage level of said data stream for producing pulses in response thereto;
   b. a second one-shot connected to receive said data stream responsive to each negative-going transition in the voltage level of said data stream for producing pulses in response thereto;
   c. a third one-shot, having an output terminal that is at a high voltage level or a low voltage level, connected to said first and second one-shots for receiving pulses therefrom, said third one-shot responsive to, when the output terminal thereof is at said low voltage level, to positive-going transitions in the voltage level of said pulses for producing timing pulses at the output terminal thereof, each timing pulse having said high voltage level and having a pulse width greater than one-half of the bit period of said data stream;
   d. a clock pulse generator connected to the output terminal of said third one-shot responsive to the positive-going or negative-going voltage level transitions in said timing pulse for generating a clock pulse;
   e. means comprising an OR-gate connected to said first and second one-shots for receiving pulses therefrom; and
   f. means connected to said OR-gate for receiving OR'ed pulses from said first and second one-shots and connected to said clock pulse generator for counting the number of positive-going or negative-going voltage level transitions in the pulses received from said OR-gate occurring between successive clock pulses and for producing a first output voltage level when said number is one and for producing a second output voltage level when said number is two.

21. The combination set forth in claim 20, wherein said means for counting comprises a first and a second flip-flop, the first of which is connected to receive pulses from said OR-gate and the second of which is connected to the first flip-flop and changes state when the first has received its second pulse from said OR-gate.

* * * * *

UNITED STATES PATENT OFFICE
CERTIFICATE OF CORRECTION

PATENT NO. : 3,967,061
DATED : June 29, 1976
INVENTOR(S) : Joseph J. Dobias

It is certified that error appears in the above-identified patent and that said Letters Patent are hereby corrected as shown below:

Column 8, line 4, after "pulse" add -- producing means occurring between successive clock pulses and for producing a first output voltage level when said number is one and for producing a second output voltage level when said number is two. --

Column 9, line 22, after "and" add -- d) a clock pulse generator connected to the output terminal of said third one-shot responsive to the positive-going or negative-going voltage level transitions in said timing pulse for generating a clock pulse. --

Signed and Sealed this

Sixteenth Day of November 1976

[SEAL]

Attest:

RUTH C. MASON
Attesting Officer

C. MARSHALL DANN
Commissioner of Patents and Trademarks